(12) United States Patent
Elberson

(10) Patent No.: US 8,740,013 B2
(45) Date of Patent: Jun. 3, 2014

(54) VARIABLE FLOW AIR FLOW CONTROLLER

(75) Inventor: Michael D. Elberson, Elm Grove, WI (US)

(73) Assignee: PFP Control Technologies, LLC, Menomonee Falls, WI (US)

( * ) Notice: Subject to any disclaimer, the term of this patent is extended or adjusted under 35 U.S.C. 154(b) by 1239 days.

(21) Appl. No.: 12/060,529

(22) Filed: Apr. 1, 2008

(65) Prior Publication Data

US 2009/0242583 A1 Oct. 1, 2009

(51) Int. Cl.
*B67B 7/00* (2006.01)
*G01F 11/00* (2006.01)
*B67D 1/00* (2006.01)
*B67D 7/14* (2010.01)
*B05B 7/00* (2006.01)

(52) U.S. Cl.
USPC .................................. 222/1; 222/55; 239/61

(58) Field of Classification Search
USPC ............ 222/3–6, 55; 239/61, 569, 583; 91/31
See application file for complete search history.

(56) References Cited

U.S. PATENT DOCUMENTS

| | | | |
|---|---|---|---|
| 5,271,521 A | 12/1993 | Noss et al. | |
| 5,271,881 A * | 12/1993 | Redding, Jr. | 264/4.32 |
| 5,332,125 A | 7/1994 | Schmitkons et al. | |
| 6,161,723 A | 12/2000 | Cline et al. | |
| 6,223,645 B1 * | 5/2001 | Elberson | 91/31 |
| 6,516,707 B2 | 2/2003 | Elberson | |
| 6,541,304 B1 | 4/2003 | Bouras et al. | |
| 6,675,988 B2 | 1/2004 | Cline et al. | |
| 6,711,507 B2 | 3/2004 | Koshinaka et al. | |
| 6,795,753 B2 | 9/2004 | Vanderhoof et al. | |
| 6,874,404 B1 | 4/2005 | Elberson | |
| 6,935,107 B2 | 8/2005 | Tondolo | |
| 6,986,361 B2 | 1/2006 | Mendoza et al. | |
| 7,025,090 B2 | 4/2006 | Bramley et al. | |
| 7,086,841 B2 | 8/2006 | Cornwell | |
| 7,237,697 B2 | 7/2007 | Dunne | |

* cited by examiner

*Primary Examiner* — Paul R Durand
*Assistant Examiner* — Vishal Pancholi
(74) *Attorney, Agent, or Firm* — Boyle Fredrickson, S.C.

(57) ABSTRACT

A system for controlling the operation of pneumatic tools includes a controller for controlling the delivery of compressed air to the tool. The controller includes a first flow path that is associated with operation of the pneumatic tool at a first flow rate and a second flow path that is associated with operation of the pneumatic tool at a second flow rate. The controller is configured to automatically configure the system for operation of the pneumatic tool via a flow of air from one of the first flow path or the second flow path. In painting environments, such a system enhances control of the operation of the pump in accommodating a generally stable pump reciprocation rate as fluid viscosities change.

16 Claims, 2 Drawing Sheets

VARIABLE FLOW AIR FLOW CONTROLLER

FIELD OF THE INVENTION

The present invention relates to controllers for controlling operation of pneumatic flows, and in particular, to an air flow controller for use in industrial compressed air systems, such as in automated paint systems, where it is commonly required to move materials having different viscosities.

BACKGROUND OF THE RELATED ART

In spray paint operations, a paint fluid, commonly in the form of a liquid or a relatively fine powder, is mixed with compressed air to atomize the paint particles and transfer the atomized paint particles onto the surface of an item being painted. Frequently, a paint gun is fluidly connected to a paint source and an air source and mixes the two materials proximate a paint location. Alternatively, many paint guns include a paint container that is physically supported by the paint gun. During most painting operations, it is very important to maintain a clean paint supply in order to ensure a quality finish. The paint fluid is frequently formed from a mixture of resins and colored particulates or flakes. The paint fluid is generally delivered to a mixing point through a series of pipes, tubes, or hoses. Preferably, this fluid path is relatively smooth or free of steps of discontinuities where the resin or color particulates may collect and form an undesirable particulate or resin ball. Understandably, any collection of particulates or resin, whether solid or pliable, introduced into the fluid paint flow can detrimentally affect operation of the paint gun or quality of the paint finish.

One commonly used spray paint gun, commonly referred to as a high volume low pressure (HVLP) spray gun, generates high volumes of low-pressure air which transfers the paint particles to the surface of the article being painted with relatively low velocity. The high volume low velocity transfer of paint to the work piece reduces overspray generated during the painting process and thereby improves the paint to part transfer ratio. In such systems, a fluid regulator regulates the flow of fluid between a high-pressure port and a low-pressure port of the paint gun. Understandably, operation of such systems requires the periodic cleaning of the fluid transfer lines. This cleaning process generally includes passing a fluid having a different viscosity than the paint, such as air, a cleaning agent, or solvent through a pump to remove residual paint from the pump and the fluid paths of the spray system. Solvents are also passed through the pump when it is desired to change the color being applied to a part.

The fluid properties of paint being sprayed and the cleaning agent or other fluids passed through the pump are generally not the same. It is readily appreciated that fluid paints, even paints that have been somewhat thinned for spray application, are generally more viscous than air or cleaning agents. Commonly, when the spray system is to be cleaned for non-use or a color change, the supply of paint is replaced with a supply of cleaning agent that is then run through the system in a manner similar to the paint. Passing solvent through a system configured to deliver a spray of atomized paint undesirably alters the operation of the delivery system.

The introduction of another fluid, such as solvent, a source of air, or an air vacuum condition, to the pump substantially increases the pump reciprocation rate if the air flow is provided at a flow rate associated with moving the thicker paint through the pump. Commonly, after the initial introduction of the second fluid to the fluid system, the pump must be maintained at a paint delivery operating pressure. If the pump operating pressure is prematurely reduced, the pump may have occasion to stall thereby delaying the cleaning process. Conversely, if the pump operating pressure is maintained at a paint delivery pressure after the less viscous fluid overtakes the fluid path of the pump, operation of the pump increases to a level that detrimentally affects pump performance and/or longevity.

Accordingly, it would be desirable to provide a pneumatic tool control system that automatically alters a compressed air flow based on real-time operating characteristics of the pneumatic tool.

SUMMARY OF THE INVENTION

The present invention is directed to a system for controlling the operation of pneumatically powered tools that solves the aforementioned problems. A system includes a controller for controlling the delivery of compressed air to the tool. The controller includes a number of flow paths wherein each flow path is associated with an operational condition of the pneumatic tool. Preferably, the system includes a controller configured to provide a first flow path and a second flow path that are each associated with an operating condition of the pneumatic tool. In painting environments, the control system is configured to provide a flow that is tailored to controlled operation of a pneumatic device such as a pump or the like.

Therefore, in accordance with one aspect of the present invention, a method for controlling the delivery of compressed air to a tool includes the steps of (a) receiving compressed air from a source; (b) determining a compressed air flow rate; and (c) allowing the compressed air to flow at a selected rate sufficient to maintain a selected operating pressure when the determined compressed air flow rate is equal to or less than a flow rate set with an air flow control valve. The method further includes a step (d) that includes automatically reducing the compressed air flow rate to maintain a preset air flow rate at a pressure below the selected operating pressure when the determined compressed air flow rate exceeds the selected flow rate. Such a method delivers a compressed air flow that is responsive to the operating condition of the controlled tool.

According to another aspect of the present invention, a system for controlling operation of a pneumatic tool that is powered by compressed air is disclosed. The system includes an inlet, an outlet, and at least two flow paths between the inlet and the outlet. The inlet is configured to be connected to a source of compressed air and the outlet is configured for communicating an air flow to the pneumatic tool. The system includes an air flow controller that is constructed to 1) allow flow along a first flow path when a flow rate at the outlet approximates a desired flow rate as determined by a pressure regulator and 2) allow flow along a second flow path when the flow rate at the outlet exceeds a threshold associated with the desired flow rate to maintain a desired operation of a pneumatic tool. Such a system provides for operation of a pneumatic tool at various flow rates that are determined, in part, based on the operating condition of the tool.

Another aspect of the present invention discloses a pneumatic system that comprises a tool powered by a flow of compressed air, an air flow control valve for providing a desired flow rate, and a controller connected to the air flow control valve. The controller is configured to 1) allow the flow to the tool at the desired flow rate when the flow is not more than the desired flow rate; and 2) allow the flow to the tool at another rate independent of the desired flow rate if the flow exceeds the desired flow rate. Such a system provides for automatic control of operation of the tool in response to the operating environment.

Various other features, aspects, and advantages of the present invention will be made apparent from the following detailed description and the drawings.

BRIEF DESCRIPTION OF THE DRAWINGS

The drawings illustrate one preferred embodiment presently contemplated for carrying out the invention and in the drawings.

DETAILED DESCRIPTION OF THE PREFERRED EMBODIMENT

Figure 1:
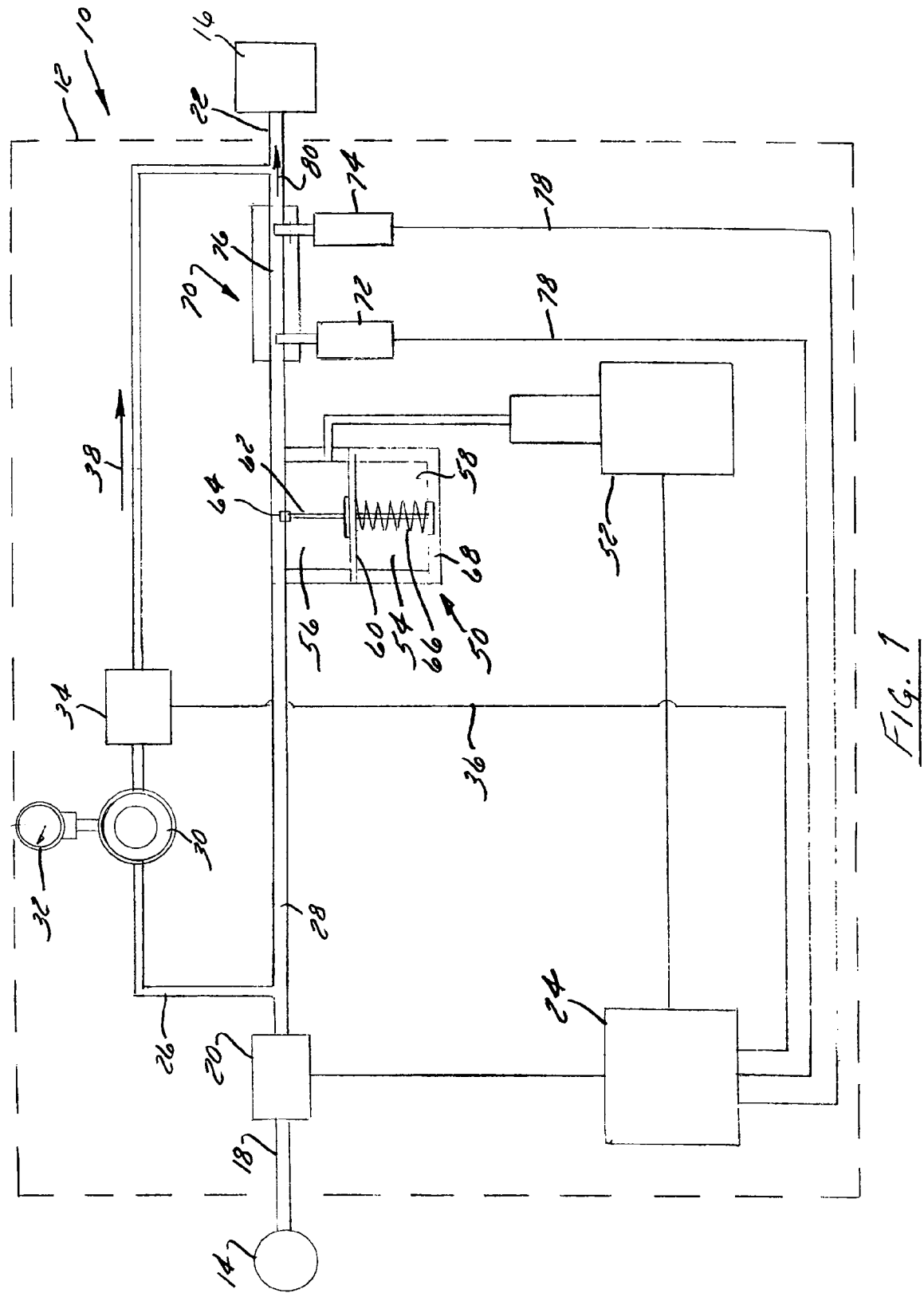
FIG. 1 is a schematic representation of a pneumatic system according to the present invention.
Figure 2:
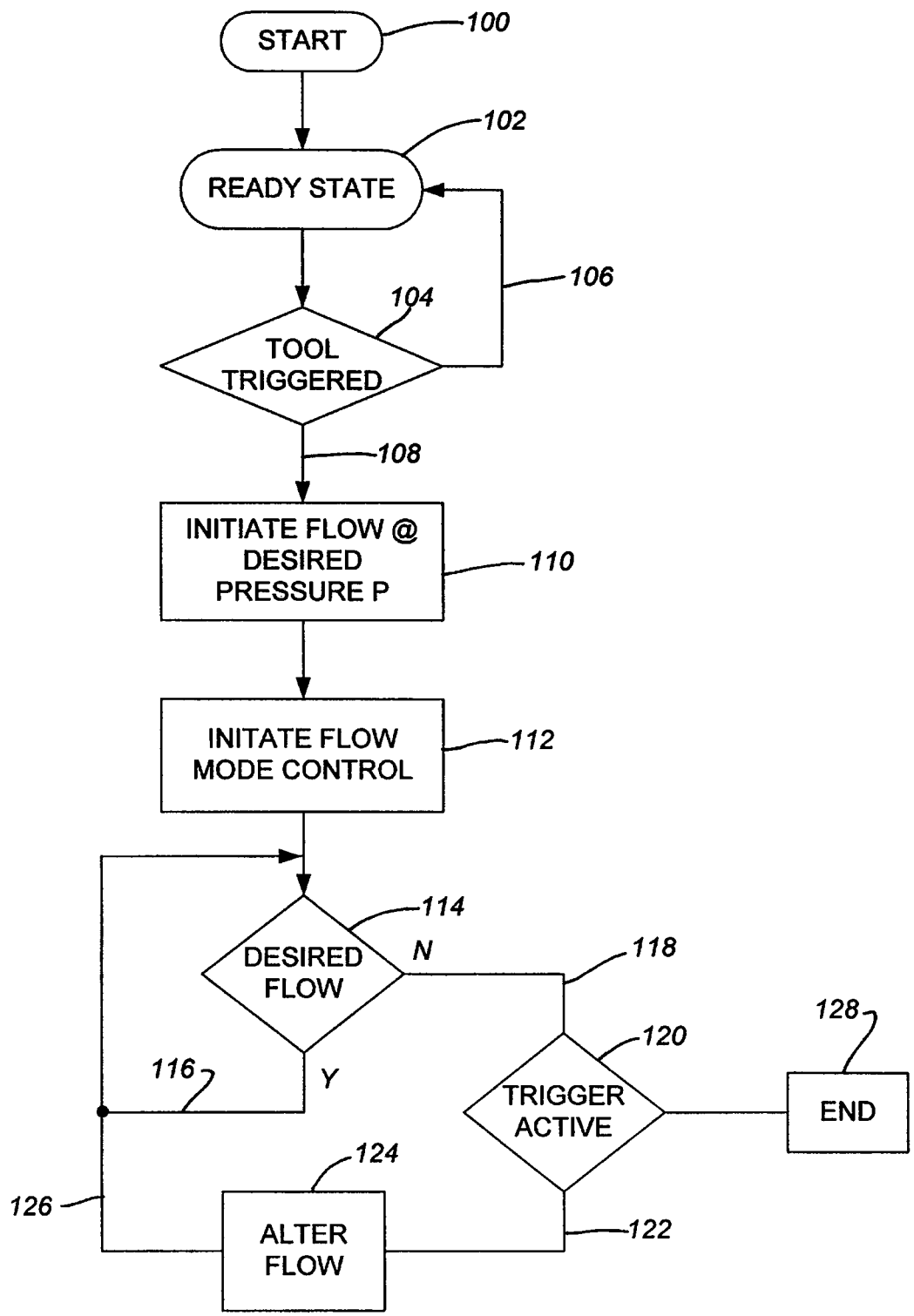
FIG. 2 is a flow chart showing operation of the pneumatic system shown in FIG. 1.

Referring to FIGS. 1 and 2, the invention disclosed herein relates to a method and apparatus for controlling the air flow rate of compressed air, sometimes referred to as either pressurized air or as atomization air, to a tool. The system and method are particularly useful in connection with a spray paint operation, in which the compressed air is mixed with a volume of liquid or powdered paint in order to atomize the paint fluid into minute particles and transfer the paint particles onto the surface of an item being painted. The present invention is particularly useful in controlling operation of pneumatic pumps whose operating speed may alter depending on the viscosity of the fluid passed through the pump. The invention disclosed herein is also adaptable for use with other types of pneumatically powered tools in which the optimal operation of the tool is dependent upon receiving more than one predetermined or desired flow rate of compressed air.

FIG. 1 is a schematic representation of a pneumatic system 10 according to the present invention. Pneumatic system 10 includes a controller or control system 12 that is fluidly connected between a source 14 of compressed air and a tool 16. System 12 includes an inlet passage 18 that extends between source 14 and a solenoid or switch 20 and an outlet passage 22 that extends to tool 16. Control system 12 includes a processor 24 that controls operation of switch 20. Downstream of switch 20, control system 12 includes a first air flow path 26 and a second air flow path 28. First air flow path 26 includes a pressure regulator 30 having a pressure gauge 32 and a solenoid or valve 34 that are positioned between switch 20 and outlet passage 22. A connection 36 extends between valve 34 and processor 24 to electro-mechanically control airflow 38 along first air flow path 26.

System 12 includes a second air flow path 28 that has an airflow control 50 that is connected to processor 24 via a converter such as a voltage pneumatic converter 52. Airflow control 50 includes an air chamber 54 that is separated into a first sub-chamber 56 and a second sub-chamber 58 by a diaphragm 60. A needle 62 extends from diaphragm 60 and engages a lateral opening or orifice 64 formed in second air flow path 28. A spring 66 is disposed in second sub-chamber 58 between diaphragm 60 and a wall 68 of airflow control 50.

An airflow meter 70 is fluidly connected to first air flow path 26 and second air flow path 28 downstream of valve 34 and airflow control 50, respectively. Airflow meter 70 includes a first pressure transducer 72 and a second pressure transducer 74. Second pressure transducer 74 is offset from first pressure transducer 72. A constriction 76 is provided between first pressure transducer 72 and second pressure transducer 74. A connection 78 extends between each pressure transducer 72, 74 and processor 24. Transducers 72, 74 and constriction 76 are associated such that processor 24 can assess the flow through second air flow path 28 as a function of a pressure differential detected at airflow meter 70. Alternatively, airflow meter 70 could be provided as a turbine flow meter or as a heat flow meter. Regardless of the specific configuration of meter 70, altering the interference of needle 62 with orifice 64 automatically alters the flow provided at outlet passage 22 to tool 16. Such a construction allows airflow control system 12 to operate tool 16 at either of first airflow 38 or a second airflow 80. Each airflow 38, 80 can be adjusted to respond to real-time changes associated with the operating state of tool 16.

Control system 12 as described above is exemplary of one control system configured to provide the desired pneumatic control of tool 16. Although control system 12 includes a number of mechanical, electrical, and electromechanical flow manipulating devices, these specific devices and orientation of devices are merely exemplary. Other devices and arrangement of such devices are envisioned and within the scope of the claims. Variations of such flow control system components and the configuration of components are disclosed in the applicants U.S. Pat. Nos. 6,516,707 and 6,223,645. The disclosures of these documents are incorporated by reference. Unlike the systems of these references, the present invention is directed to controlling the operation of a tool through providing variable flow rates that are provided generally independent of the static or dynamic nature of the flow. That is, control system 12 is configured to provide at least two different flows in response to changes in the operating condition of tool 16.

FIG. 2 graphically shows the operation of flow control system 12. Referring to FIGS. 1 and 2, at system start 100, tool 16 has yet to be triggered, and system 10 achieves a ready state 102 in that the lines of system 10 are pressurized and maintained at a generally static ready state. System 10 is maintained 104, 106 in ready state 102 until tool 16 is triggered. When tool 16 is initially triggered 108, valve 34 of system 12 is opened such that the air flow at outlet passage 22 is provided to maintain an initial air flow 110 at a desired pressure associated with regulator 30. After initial air flow 110, air flow switch 20 proximate air inlet passage 18 is activated and initiates an instruction at processor 24 to close valve 34 thereby directing flow only along second air flow path 28 such that system 10 operates in flow mode control 112.

During flow mode control 112, as air flows through the pressure differential flow meter 70, first and second transducers 72 and 74 generate an electronic pressure differential signal which is sent to processor 24. The electronic pressure differential signal is compared to a desired signal to assess if a desired flow 114 is being achieved. If a desired flow is provided 116, system 10 maintains the configuration of the respective valves of system 10 in flow mode control 112. Commonly, depending on the type of tool 16 connected to system 10, desired flow 114 relates to an operating speed of the tool under an intended load. If the desired flow is not being provided 118, and the trigger of tool 16 remains activated, 120, 122, system 10 alters the configuration of airflow control 50 until the desired flow is achieved 126.

Depending upon the difference in value between a measured signal and a value associated with the desired flow attained at flow meter 70, processor 24 directs a signal to the pneumatic converter to produce and transmit a pneumatic signal which is sent to airflow control 50 to alter the flow 124. The pneumatic signal sent to the airflow control 50 deflects diaphragm 60 to either open the flow control valve to permit a greater flow of pressurized air through the system, or close the air control valve in order to restrict the amount of air flowing through the system.

In a paint pump application, when a paint pump is initially provided with an air flow during pumping of paint, the reciprocation rate of the pump is affected by the viscosity of the material being pumped. If the air flow rate measured at meter 70 is lower than the desired level associated with the airflow control 50, system 12 operates at the predetermined pressure associated with regulator 30 as needle 62 will be maintained in a fully open position or a position wherein needle 62 does not interfere with orifice 64. Transducers 72 and 74 provide signals with which processor 24 can determine a desired operating flow rate. If the viscosity of the material passed through the pump changes, such as by introducing an air fluid, a fluid experiencing a vacuum condition, or a solvent through the pump, the lower viscosity of the alternate fluid allows the pump to reciprocate faster when air is supplied at the desired pressure that is associated with operation of the pump to move paint.

The faster reciprocation of the pump is indicative of a higher air flow rate through system 12. When system 12 experiences a higher air flow rate at a desired operating pressure, processor 24 generates an instruction to introduce needle 62 into orifice 64 thereby restricting second air flow path 28. The introduction of needle 62 into orifice 64 reduces the operating pressure provided to the pump by maintaining a desired air flow rate that correlates to an air flow rate associated with moving paint. Such a configuration provides controlled operation of a pneumatically operated pump independent of the viscosity of the material passed through the pump. By controlling the operation of the pump by the air flow rate delivered to the pump, unnecessary racing of the pump can be avoided.

Such real-time and dynamic control of pneumatic tool 16 continues until the trigger of tool 16 is deactivated 128. When the tool 16 is triggered off, air flow through the pressure differential flow meter 70 is suspended. When there is no air flow through the pressure differential flow meter 70, the electronic signal produced by the first and second transducers 72 and 74 is equal, processor 24 generates an instruction to open valve 34 in air flow path 26, and thereby revert the system back to pressure regulation status.

It is to be understood that the embodiments disclosed above are merely exemplary of the invention which may be embodied in various forms. Changes maybe made in the details of construction, arrangement and operation of various elements of the invention without departing from the spirit of the invention. For example, the flow rate control of system 12 might be activated by any of an electronic, pneumatic, electromechanical, or any combination thereof, signal received from the tool rather than just a pneumatic signal. Therefore, specific structural and functional details disclosed above are not to be interpreted as limiting the scope of the invention.

As one skilled in the art will fully appreciate, the heretofore description of an air flow control system has applications beyond the disclosed paint sprayer application. It is appreciated that the present invention is equivalently applicable with any device that requires more than one controlled air flow and/or those systems wherein it may be beneficial to alter the operating paradigm that is used to configure the operation of the pneumatic device. The description of a paint sprayer illustrates just one embodiment in which the present invention may be implemented. The present invention has been described in terms of the preferred embodiment, and it is recognized that equivalents, alternatives, and modifications, aside from those expressly stated, are possible and within the scope of the appending claims.

What is claimed is:

1. A method for controlling the delivery of compressed air to a tool, the method comprising the steps of:
    (a) receiving compressed air from a source;
    (b) determining a compressed air flow rate;
    (c) allowing the compressed air to flow through a first flow path at a selected rate sufficient to maintain a selected operating pressure when the determined compressed air flow rate is equal to or less than an air flow rate set with an air flow control valve associated with pumping a paint material having a first viscosity with a pump; and
    (d) automatically reducing the compressed air flow rate communicated to the pump, independent of a static and dynamic nature of the compressed air flow, by directing the compressed air to the pump via a second adjustable flow path, to maintain a preset air flow rate a pressure below the selected operating pressure associated with the first flow path when the determined compressed air flow rate associated with pumping a material having a second viscosity that is lower than the first viscosity of the paint material through the pump exceeds the selected flow rate to maintain operation of the pump at similar reciprocation rates for fluids having different viscosities.

2. The method of claim 1 wherein step (c) includes receiving an activation signal from a tool.

3. A system for controlling operation of a pneumatic tool that is powered by compressed air, the system comprising:
    an inlet for being connected to a source of compressed air;
    an outlet for communicating an air flow to a pump of a paint delivery system;
    at least two flow paths between the inlet and the outlet; and
    an air flow controller constructed to 1) allow flow along a first flow path via operation of a valve when a flow rate at the outlet approximates a desired flow rate as determined by a pressure regulator and a flow meter based on a viscosity of a first fluid passed through the pump and 2) allow flow along a second flow path when the flow rate at the outlet exceeds a threshold associated with the desired flow rate as determined by the pressure regulator and the flow meter and base on a viscosity of a second fluid passed through the pump that has a different viscosity than the first fluid to maintain a desired reciprocation rate of the pump during operation of the pump to move fluids having different viscosities and as a function of the viscosity of fluid delivered by the pump and independent of a static or dynamic nature of the air flow to the pump.

4. The system of claim 3 wherein the first flow path and the second flow path are associated with operation of the fluid pump at a desired pressure and a desired flow rate for the first fluid and the second fluid, respectively.

5. The system of claim 4 wherein the air flow controller is configured to maintain a relatively consistent reciprocation rate when the pump is pumping a paint solution and a fluid having a viscosity that is lower than a viscosity of the paint solution independent of user interaction with the system.

6. The system of claim 3 wherein the regulator is self-relieving.

7. The system of claim 3 wherein the air flow controller automatically switches the air flow between the first flow path to the second flow.

8. The system of claim 3 wherein the threshold is further defined as one of a preset flow rate or a preset pressure.

9. The system of claim 3 wherein the second flow path maintains a flow rate at a variable preset pressure.

10. A pneumatic system comprising:

a tool powered by a flow of compressed air;

an air flow control valve for providing a desired air flow rate that is to be communicated to the tool powered by the flow of compressed air such that the tool operates at a first cycle rate; and a controller connected to the air flow control valve and disposed upstream of a pressure based flow meter and configured to:

1) allow the air flow to the tool at the desired flow rate along a first flow path associated with the airflow control valve when the air flow is not more than the desired flow rate based on a viscosity of a fluid moved by the tool to achieve the first cycle rate; and 2) allow the air flow to the tool at another air flow rate associated with a second flow path automatically in response to changes in viscosity of the fluid moved by the tool if the air flow rate exceeds the desired air flow rate to maintain operation of the tool proximate the first cycle rate and wherein the desired air flow rate and the another air flow rate associated with the first and second flow paths are allowed to flow to the tool independent of a static and dynamic nature of the air flow.

11. The pneumatic system of claim 10 further comprising an air flow meter that is connected to the controller for detecting the air flow delivered to the tool.

12. The pneumatic system of claim 10 wherein the tool is a pump of a paint spay system and the desired air flow rate is associated with a viscosity of a paint solution and the another air flow rate is associated with a viscosity of another fluid.

13. The pneumatic system of claim 10 wherein the controller is configured to automatically alter the air flow to maintain a pump reciprocation rate that is the same for fluids having different viscosities.

14. The pneumatic system of claim 13 wherein the controller includes a first fluid path for establishing the desired air flow rate and a second fluid path associated with providing one of the desired air flow rate and the another air flow rate.

15. The pneumatic system of claim 10 wherein the desired air flow rate is determined by a user's selection of a desired operating pressure.

16. The pneumatic system of claim 15 wherein the desired operating pressure is provided via a self-relieving pressure regulator.

* * * * *